United States Patent
Ohori et al.

(10) Patent No.: US 10,503,005 B2
(45) Date of Patent: Dec. 10, 2019

(54) WIRE GRID POLARIZATION ELEMENT AND PROJECTION TYPE DISPLAY APPARATUS

(71) Applicant: SEIKO EPSON CORPORATION, Tokyo (JP)

(72) Inventors: Mitsutaka Ohori, Shiojiri (JP); Koichiro Akasaka, Ina (JP); Yoshitomo Kumai, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/912,977

(22) Filed: Mar. 6, 2018

(65) Prior Publication Data
US 2018/0267357 A1    Sep. 20, 2018

(30) Foreign Application Priority Data

Mar. 14, 2017    (JP) .................... 2017-048368

(51) Int. Cl.
*G02F 1/1335*    (2006.01)
*G02F 1/1339*    (2006.01)
*H04N 5/74*    (2006.01)

(52) U.S. Cl.
CPC ...... *G02F 1/133528* (2013.01); *G02F 1/1339* (2013.01); *H04N 5/74* (2013.01); *G02F 2001/133548* (2013.01)

(58) Field of Classification Search
CPC .... G03B 21/00; H04N 9/3105; H04N 9/3167; H04N 5/74; G02F 1/1339; G02F 1/133528; G02F 2001/133548
See application file for complete search history.

(56) References Cited

U.S. PATENT DOCUMENTS

| 2003/0117708 | A1* | 6/2003 | Kane | G02B 5/3058 |
| | | | | 359/513 |
| 2004/0008416 | A1* | 1/2004 | Okuno | G02B 5/1809 |
| | | | | 359/566 |
| 2006/0061519 | A1* | 3/2006 | Fisher | G02F 1/133528 |
| | | | | 345/32 |
| 2006/0061862 | A1* | 3/2006 | Mi | G02B 5/3058 |
| | | | | 359/485.05 |
| 2008/0145568 | A1* | 6/2008 | Lee | C23C 18/1608 |
| | | | | 427/595 |

(Continued)

FOREIGN PATENT DOCUMENTS

| JP | 2005-513547 A | | 5/2005 |
| JP | 2009217218 | * | 9/2009 |
| WO | 2003/054619 A3 | | 6/2004 |

*Primary Examiner* — Hoan C Nguyen
(74) *Attorney, Agent, or Firm* — Oliff PLC

(57) ABSTRACT

In a wire grid polarization element, a second light transmissing substrate is disposed on first surface side of the first light transmissing substrate on which a metallic wire grid is formed, and on the first surface of the first substrate, a recessed portion is formed in a region overlapping a region where the wire grid is formed in plan view. For this reason, it is possible to secure a space in which the wire grid is disposed between the first substrate and the second substrate without using a spacer. In addition, at the time of sealing the space in which the wire grid is disposed, the first substrate and the second substrate are bonded to each other on the outer side of the recessed portion.

20 Claims, 5 Drawing Sheets

(56) References Cited

U.S. PATENT DOCUMENTS

| | | | | |
|---|---|---|---|---|
| 2009/0027773 A1* | 1/2009 | Kawakami | ............ | G02B 5/3058 |
| | | | | 359/485.05 |
| 2012/0050627 A1* | 3/2012 | Furuta | .................. | G02B 5/3058 |
| | | | | 349/8 |
| 2012/0168065 A1* | 7/2012 | Kaida | .................. | G02B 5/3058 |
| | | | | 156/246 |
| 2013/0250412 A1* | 9/2013 | Aota | .................... | G02B 5/3058 |
| | | | | 359/485.05 |
| 2016/0026034 A1* | 1/2016 | Nam | ...................... | G02B 5/208 |
| | | | | 349/43 |

\* cited by examiner

WIRE GRID POLARIZATION ELEMENT AND PROJECTION TYPE DISPLAY APPARATUS

BACKGROUND

1. Technical Field

The present invention relates to a wire grid polarization element which is provided with a metallic wire grid, and a projection type display apparatus.

2. Related Art

The projection type display apparatus includes a liquid crystal panel, a light source unit that emits light to be supplied to the liquid crystal panel, and a projection optical system that projects light modulated by a light valve, and polarization elements are arranged on an optical path from the light source unit to the projection optical system via a liquid crystal panel. As for the polarization element, a polarization element formed of an organic material is mainly used, but the polarization element formed of the organic material has low heat resistance. In this regard, using a wire grid polarization element (an inorganic polarization element) in which a metallic wire grid formed of aluminum, an aluminum alloy, or the like is formed on a light transmitting substrate has been proposed. However, there is a problem in that the metallic wire grid formed of aluminum, an aluminum alloy, or the like reacts with moisture and oxygen or the like in air, and thus corrosion and oxidation are likely to occur. On the other hand, a configuration in which a glass cover sheet faces one surface side of the light transmitting substrate on which the wire grid is formed via a spacer, and the light transmitting substrate and the glass cover sheet are fixed to each other by using a sealant (an adhesive) on the outer circumference side on which the spacer is disposed (refer to JP-T-2005-513547) has been proposed.

However, as the configuration described in JP-T-2005-513547, in the configuration in which the light transmitting substrate and the glass cover sheet face each other via the spacer, a gap between the light transmitting substrate and the glass cover sheet on the outer circumference side is wide, and thus even when the light transmitting substrate and the glass cover sheet are sealed by using the sealant (the adhesive), moisture and oxygen may permeate through the sealant.

SUMMARY

An advantage of some aspects of the invention is to provide a wire grid polarization element that can reliably seal a space in which the wire grid is formed, and a projection type display apparatus.

According to an aspect of the invention, there is provided a wire grid polarization element including a first light transmitting substrate, a metallic wire grid formed on first surface of the first substrate, a second light transmitting substrate facing the first surface of the first substrate, in which on at least one of the first surface of the first substrate and a surface of the second substrate facing the first substrate, a recessed portion is formed in a region overlapping a region where the wire grid is formed, in plan view, and the first substrate and the second substrate are bonded to each other on the outer side of the recessed portion so as to seal a space in which the wire grid is disposed.

In the element, the second light transmitting substrate is disposed on first surface side of the first light transmitting substrate on which the metallic wire grid is formed, and on at least one of the first surface side of the first substrate, and a surface of the second substrate facing the first substrate, a recessed portion is formed in a region overlapping a region where the wire grid is formed in plan view. For this reason, it is possible to secure a space in which the wire grid is disposed between the first substrate and the second substrate without using a spacer. In addition, at the time of sealing the space in which the wire grid is disposed, the first substrate and the second substrate are bonded to each other on the outer side of the recessed portion, and thus a gap between the first substrate and the second substrate at a bonded portion is small. Accordingly, it is possible to reliably seal the space in which the wire grid is formed such that moisture and oxygen are less likely to permeate from between the first substrate and the second substrate.

In the element, it is preferable to employ a configuration in which an inner wall of the recessed portion is a tapered surface. According to the configuration, even though a machining process such as grinding is not performed on the first substrate, it is possible to efficiently form a recessed portion by etching or the like, and in this case, the inner wall of the recessed portion becomes the tapered surface.

In the element, it is preferable to employ a configuration in which the space in which the wire grid is disposed is filled with an inert gas. According to the configuration, it is possible to prevent corrosion and oxidation of the wire grid.

In the element, it is preferable to employ a configuration in which the wire grid is formed of aluminum, an alloy containing aluminum as a main component, silver, or an alloy containing silver as a main component. According to the configuration, an absorption loss in the wire grid is small in a visible light wavelength region.

In the element, it is preferable to employ a configuration in which a light absorbing layer is formed at an end portion of the wire grid on the side opposite to the first substrate. According to the configuration, it is possible to prevent reflection at a tip end portion of the wire grid.

In the element, it is preferable to employ a configuration in which an antireflection layer is formed on at least any one of the first surface of the first substrate, a surface on the side opposite to the first surface of the first substrate, a surface of the second substrate facing the first substrate, and a surface of the second substrate on the side opposite to the first substrate. According to the configuration, it is possible to prevent the reflection on the first substrate and the second substrate.

In the element, it is preferable to employ a configuration in which the first substrate and the second substrate are formed of the same material.

In the element, it is preferable to employ a configuration in which the recessed portion is formed on the second substrate.

The wire grid polarization element according to the aspect can be used for a projection type display apparatus. According to another aspect of the invention, there is provided a projection type display apparatus including a liquid crystal panel, a light source unit that emits light to be supplied to the liquid crystal panel, and a projection optical system that projects light modulated by the liquid crystal panel, in which the wire grid polarization element is disposed on an optical path from the light source unit to the projection optical system via the liquid crystal panel.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
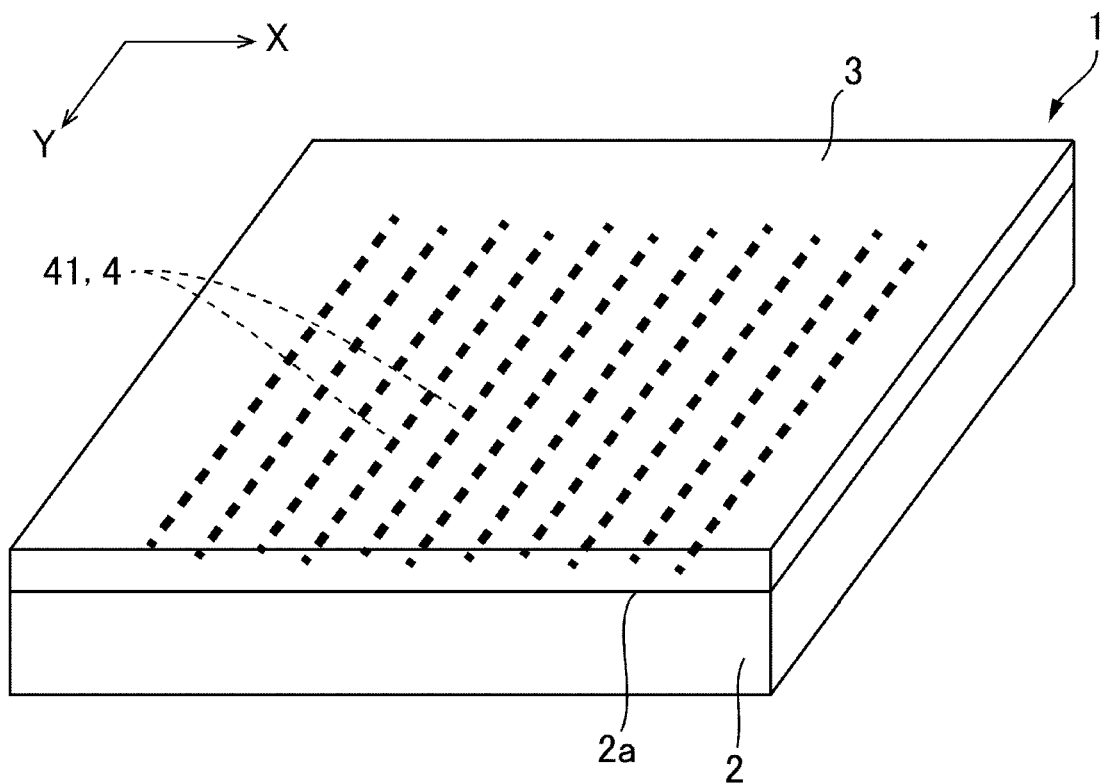
FIG. 1 is a diagram illustrating an appearance of a wire grid polarization element according to a first embodiment of the invention.

The embodiments of the invention will be described with reference to drawings. Note that, in the drawings referred to in the following description, in order to make each layer and each member to be recognizable on the drawing, the scales of each layer and each member are made different. In addition, in the following description, in a direction in which wire grids 4 (metal fine wires 41) are extended is set as a Y direction, and a direction in which the metal fine wires 41 are parallel is set as an X direction.

First Embodiment

Configuration of Wire Grid Polarization Element 1

Figure 2:
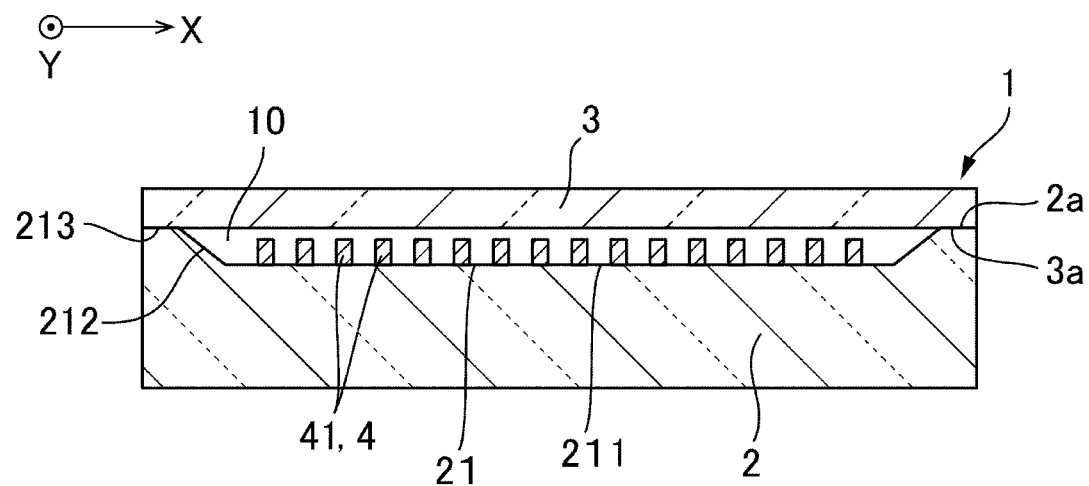
FIG. 2 is a sectional view of the wire grid polarization element as illustrated in FIG. 1, and is a diagram illustrating an electro-optical apparatus according to the first embodiment of the invention.

FIG. 1 is a diagram illustrating a wire grid polarization element 1 according to the embodiment of the invention. FIG. 2 is a sectional view of the wire grid polarization element 1 as illustrated in FIG. 1. The wire grid polarization element 1 as illustrated in FIGS. 1 and 2 includes a light transmissing first substrate 2, and the metallic wire grids 4 formed on one surface 2a of the first substrate 2. The wire grid 4 is formed of a plurality of the metal fine wires 41 which are arranged in parallel, and the thickness of the metal fine wire 41 and a space (a distance between the metal fine wires 41) are, for example, equal to or less than 400 nm. In the embodiment, each of the thickness and the space of the metal fine wire 41 is, for example, in a range of 100 nm to 200 nm. In the wire grid 4 configured as described above, if a pitch of the metal fine wire 41 is sufficiently shorter than a wavelength of incident light, among the incident lights, light of a first polarization which is a component having an electric field vector orthogonal to the longitudinal direction of the metal fine wire 41 is transmitted, and light of a second polarization which is a component having an electric field vector parallel with the longitudinal direction of the metal fine wire 41 is reflected.

The wire grid 4 (the metal fine wire 41) is aluminum, silver, copper, platinum, gold, or an alloy containing those as a main component. In the embodiment, from the aspect that an absorption loss in the wire grid 4 is prevented to be small in a visible light wavelength region, the wire grid 4 is formed of aluminum, an alloy containing aluminum as a main component, silver, or an alloy containing silver as a main component.

In the embodiment, from the viewpoint of preventing the reaction of the wire grid 4 and the moisture or oxygen, a light transmissing second substrate 3 facing a one surface 2a of the first substrate 2 is provided so as to seal the space in which the wire grid 4 is disposed. In the embodiment, as the first substrate 2 and the second substrate 3, a glass substrate, a quartz substrate, a crystal substrate, and the like can be used. In the embodiment, the first substrate 2 and the second substrate 3 are crystal substrates, which are formed of the same material.

In order to realize the above-described sealing structure, on at least one of the one surface 2a of the first substrate 2 and a surface 3a of the second substrate 3 facing the first substrate 2, a recessed portion is formed in a region overlapping a region where the wire grid 4 is formed in plan view, and the one surface 2a of the first substrate 2 and the surface 3a of the second substrate 3 are bonded to each other on the outer side of the recessed portion.

In the embodiment, the second substrate 3 is formed into a plate, and on one surface 2a of the first substrate 2, a recessed portion 21 is formed in the region overlapping region where the wire grid 4 is formed in plan view. Accordingly, the wire grid 4 is formed on a bottom 211 of the recessed portion 21. In addition, an inner wall 212 of the recessed portion 21 becomes a forward tapered surface with an inclined surface facing the opening side. Further, one surface 2a of the first substrate 2 and the surface 3a of the second substrate 3 are bonded to each other by using a bonding method such as an atomic diffusion bonding method, a glass bonding method such as optical contact, and a bonding method with an adhesive in a frame 213 surrounding over the entire circumference of the recessed portion 21 so as to seal a space 10 in which the wire grid 4 is disposed.

Manufacturing Method of Wire Grid Polarization Element 1

Figure 3:
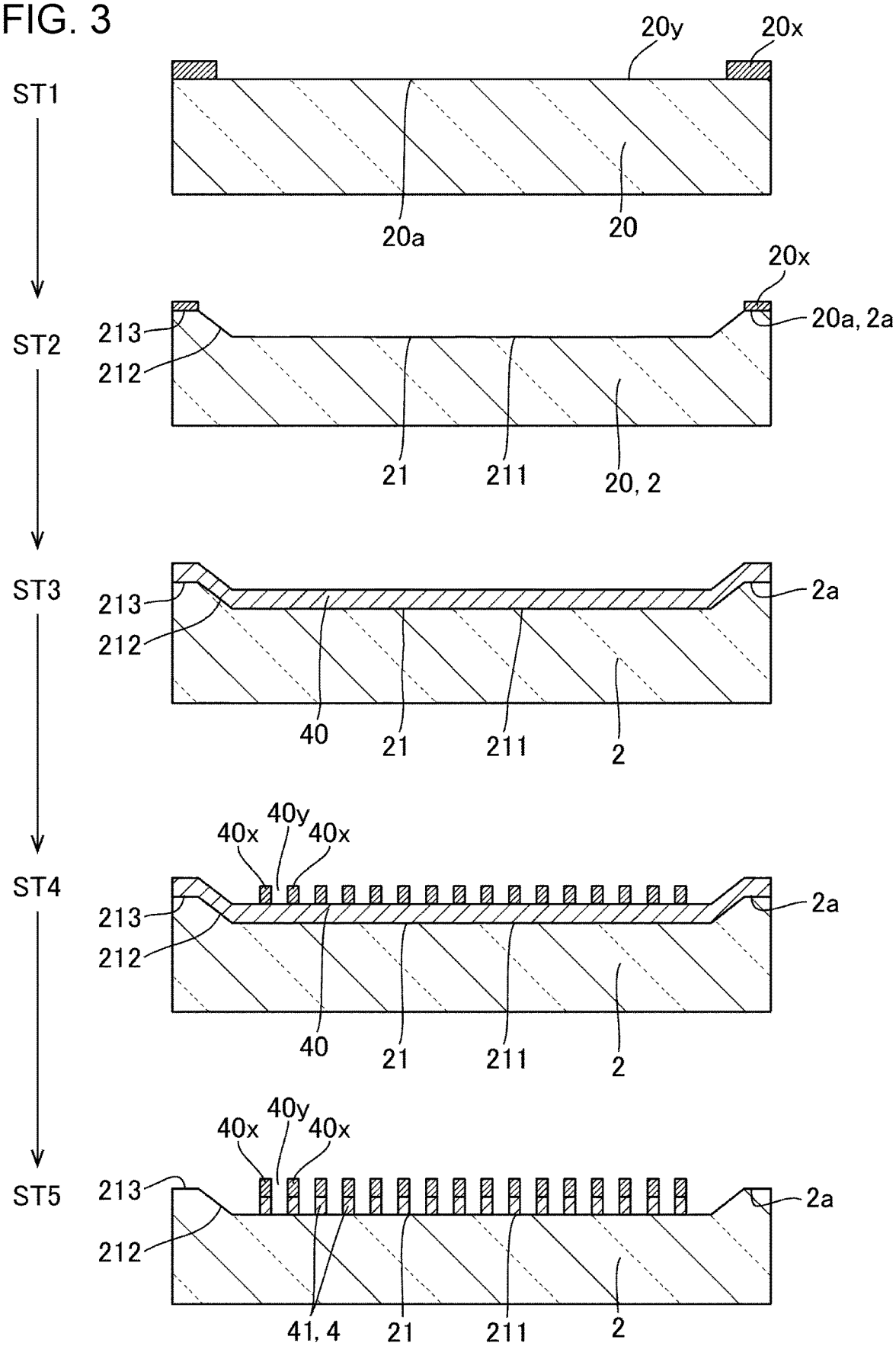
FIG. 3 is a sectional view illustrating a method of manufacturing the wire grid polarization element as illustrated in FIG. 2.

FIG. 3 is a sectional view illustrating a method of manufacturing the wire grid polarization element 1 as illustrated in FIG. 2. In the manufacturing step of the wire grid polarization element 1 as illustrated in FIG. 3, first, in a mask forming step for forming a recessed portion ST1 as illustrated in FIG. 2, one surface 20a of the plate-like light transmissing substrate 20 for manufacturing the first substrate 2 is coated with a resist, and then exposure and development are performed thereon so as to form a frame-like etching matrix 20x.

Next, in an etching forming step for forming a recessed portion ST2 as illustrated in FIG. 3, the etching matrix 20x is removed after etching is performed on the one surface 20a of the light transmissing substrate 20 from an opening 20y of the etching matrix 20x. As a result, it is possible to obtain the first substrate 2 on which the recessed portion 21 is formed on one surface 20a of the light transmissing substrate 20. In the etching step, for example, dry etching is performed so as to etch the one surface 20a of the light transmissing substrate 20 while etching the etching matrix 20x. Accordingly, the inner wall 212 of the recessed portion 21 becomes a tapered surface. For this reason, even though a machining process such as grinding is not performed on the light transmissing substrate 20, it is possible to efficiently form the recessed portion 21 by etching or the like, and in this case, the inner wall 212 of the recessed portion 21 becomes the tapered surface. In addition, since the inner wall 212 of the recessed portion 21 becomes the tapered surface, in the following step, after the first substrate 2 is cleaned, a cleaning liquid is less likely to remain inside the recessed portion 21 at the time of drying.

Next, in a film forming step ST 3 as illustrated in FIG. 3, a metallic film 40 which is formed of aluminum, an alloy containing aluminum as a main component, silver, or an alloy containing silver as a main component is formed on the one surface 2a of the first substrate 2 by using a vapor deposition method, a sputtering method, and the like.

Next, in a mask forming step for patterning ST4 as illustrated in FIG. 3, coating with a resist, exposure, and development are performed so as to form an etching matrix 40x on the surface of the metallic film 40. The etching matrix 40x has the same pattern as that of the wire grid 4 as illustrated in FIG. 2.

Next, in a pattern forming step ST5 as illustrated in FIG. 3, the etching matrix 40x is removed after etching is performed on the metallic film 40 from an opening 40y of the etching matrix 40x. As a result, the wire grid 4 is formed.

Next, in the bonding step, as illustrated in FIG. 2, when one surface 2a of the first substrate 2 and the surface 3a of the second substrate 3 are bonded to each other by using a bonding method such as an atomic diffusion bonding method, a method of bonding glasses such as optical contact to each other, and a bonding method with an adhesive in a frame 213 surrounding over the entire circumference of the recessed portion 21 on the outer side, it is possible to obtain a wire grid polarization element 1. Note that, in the above-described step, a large-sized substrate is used as the first substrate 2 (the light transmissing substrate 20) and the second substrate 3, and after bonding step, the first substrate 2 (the light transmissing substrate 20) and the second substrate 3 may be cut into a single piece size.

Main Effect of the Embodiment

As described above, in the wire grid polarization element 1 according to the embodiment, the second light transmissing substrate 3 is disposed on one surface side 2a of the first light transmissing substrate 2 on which the metallic wire grid 4 is formed, and on the one surface 2a of the first substrate 2, the recessed portion 21 is formed in a region overlapping a region where the wire grid 4 is formed in plan view. For this reason, it is possible to secure a space in which the wire grid 4 is disposed between the first substrate 2 and the second substrate 3 without using a spacer. In addition, at the time of sealing the space 10 in which the wire grid is 4 disposed, the first substrate 2 and the second substrate 3 are bonded to each other on the outer side of the recessed portion 21, and thus a gap between the first substrate 2 and the second substrate 3 at a bonded portion is small. Accordingly, it is possible to reliably seal the space 10 in which the wire grid 4 is formed such that moisture and oxygen are less likely to permeate from between the first substrate 2 and the second substrate 3.

Second Embodiment

Figure 4:
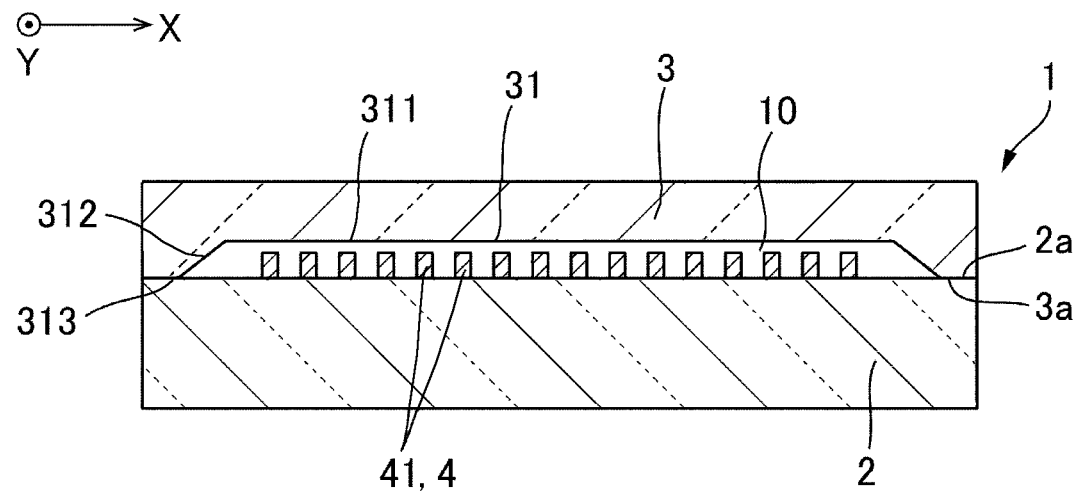
FIG. 4 is a sectional view of a wire grid polarization element according to a second embodiment of the invention.

FIG. 4 is a sectional view of a wire grid polarization element 1 according to a second embodiment of the invention. Note that, a basic configuration of the embodiment is the same as that of the first embodiment, and thus the same reference numerals are assigned to the common parts, and the description thereof will not be repeated.

In the first embodiment, the recessed portion 21 is formed on the first substrate 2; whereas in the present embodiment, a recessed portion 31 is formed on the second substrate 3. More specifically, similar to the first embodiment, the wire grid polarization element 1 as illustrated in FIG. 4 includes the metallic wire grid 4 formed on the light transmissing first substrate 2 and one surface 2a of the first substrate 2. The wire grid 4 (the metal fine wire 41) is formed of an alloy containing aluminum as a main component, silver, or an alloy containing silver as a main component. In addition, the light transmissing second substrate 3 facing the one surface 2a of the first substrate 2 is provided so as to seal the space in which the wire grid 4 is disposed. The first substrate 2 and the second substrate 3 are crystal substrates, which are formed of the same material.

In order to realize the sealing structure, In the embodiment, the first substrate 2 is formed into a plate, on one surface 3a of the second substrate 3, a recessed portion 31 is formed in the region overlapping the region where the wire grid 4 is formed in plan view. Accordingly, the wire grid 4 is formed on a bottom 311 of the recessed portion 31. In addition, an inner wall 312 of the recessed portion 31 becomes a forward tapered surface with an inclined surface facing the opening side. Further, one surface 2a of the first substrate 2 and the surface 3a of the second substrate 3 are bonded to each other by using a bonding method such as an atomic diffusion bonding method, a glass bonding method such as optical contact, and a bonding method with an adhesive in a frame 313 surrounding over the entire circumference of the recessed portion 31 so as to seal a space 10 in which the wire grid 4 is disposed.

Even with the wire grid polarization element 1 configured as described above, similar to the first embodiment, it is possible to secure a space in which the wire grid 4 is disposed between the first substrate 2 and the second substrate 3 without using a space. In addition, at the time of sealing the space 10 in which the wire grid is 4 disposed, the first substrate 2 and the second substrate 3 are bonded to each other on the outer side of the recessed portion 31, and thus a gap between the first substrate 2 and the second substrate 3 at a bonded portion is small. Accordingly, it is possible to reliably seal the space 10 in which the wire grid 4 is formed such that moisture and oxygen are less likely to permeate from between the first substrate 2 and the second substrate 3. In addition, since the first substrate 2 is formed into a plate, it is easy to form the wire grid 4 on the first substrate 2.

Third Embodiment

Figure 5:
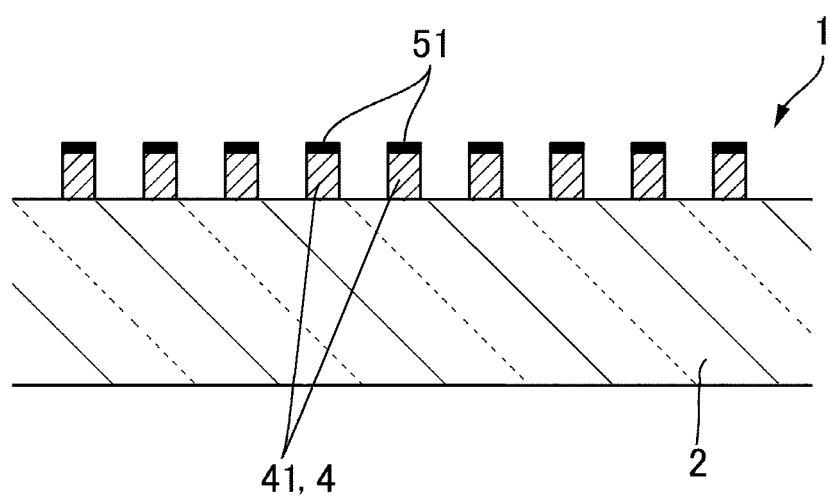
FIG. 5 is an enlarged diagram illustrating a wire grid of a wire grid polarization element according to a third embodiment of the invention.

FIG. 5 is an enlarged diagram illustrating a wire grid 4 of a wire grid polarization element 1 according to the third embodiment of the invention. Note that, a basic configuration of the embodiment is the same as that of the first embodiment, and thus the same reference numerals are assigned to the common parts, and the description thereof will not be repeated. In the first and second embodiments, the wire grid 4 is formed of only the metal fine wire 41; however, as illustrated in FIG. 5, the invention may be applied to a case where a light absorbing layer 51 such as silicon and germanium is formed at an end portion (a tip end portion of the metal fine wire 41) of the wire grid 4 on the side opposite to the first substrate 2. According to the configuration, it is possible to prevent the light incident from the second substrate 3 side from being reflected on the wire grid 4.

Fourth Embodiment

In the first to third embodiments, the space 10 in which the wire grid 4 is disposed between the first substrate 2 and the second substrate 3 may be filled with an inert gas such as nitrogen. According to the aspect, it is possible to prevent corrosion and oxidation of the wire grid 4 immediately after manufacturing. The aspect can be realized by performing the step of bonding the first substrate 2 and the second substrate 3 in an inert gas atmosphere such as a nitrogen gas atmosphere.

Fifth Embodiment

In the first to fourth embodiments, it is possible to employ an aspect in which an antireflection layer formed of a dielectric multilayer film is formed on at least any one of one surface 2a of the first substrate 2, a surface on the side opposite to the one surface 2a of the first substrate 2, a surface 3a of the second substrate 3 facing the first substrate 2, and a surface on the side opposite to the first substrate 2 of the second substrate 3. According to the aspect, it is possible to prevent the reflection on the first substrate 2 and the second substrate 3.

Configuration Example 1 of Projection Type Display Apparatus

Figure 6:
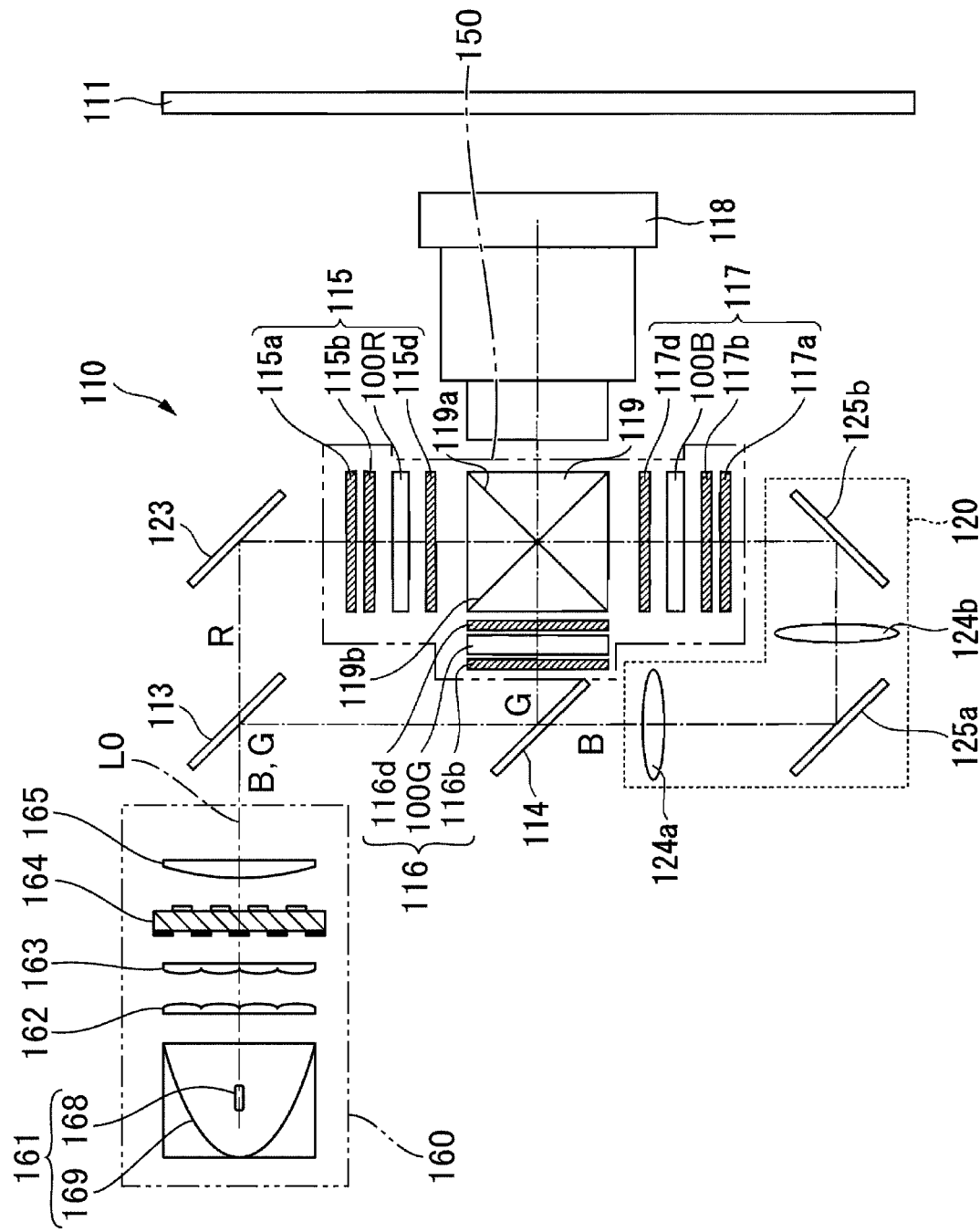
FIG. 6 is a diagram of a projection type display apparatus using a transmissive liquid crystal panel.
Figure 7:
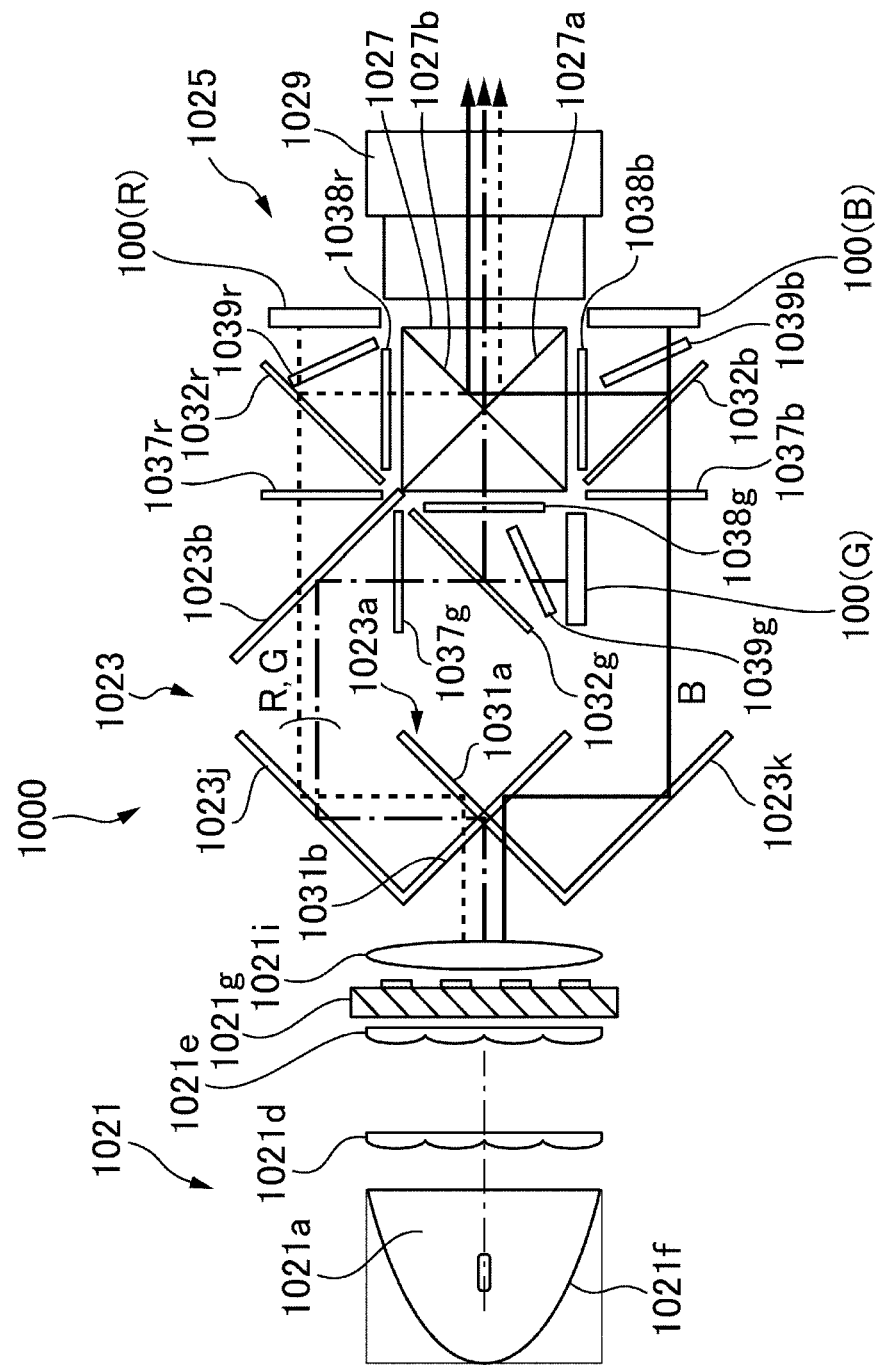
FIG. 7 is a diagram of a projection type display apparatus using a transmissive liquid crystal panel.

A projection type display apparatus (a LCD projector) using the wire grid polarization element 1 according to the above-described embodiment will be described. FIG. 6 is a diagram of a projection type display apparatus using a transmissive liquid crystal panel. Note that, both of a projection type display apparatus 110 as illustrated in FIG. 6 and a projection type display apparatus 1000 described later with reference to FIG. 7 are provided with a liquid crystal panel, a light source unit that emits the light supplied to the liquid crystal panel, and a projection optical system that projects light modulated by the liquid crystal panel, in which the wire grid polarization element 1 described with reference to FIGS. 1 to 5 is disposed on an optical path from the light source unit to the projection optical system via the liquid crystal panel.

The projection type display apparatus 110 as illustrated in FIG. 6 is a liquid crystal projector using a transmissive liquid crystal panel, and irradiates a member to be projected 111 formed a screen or the like with light so as to form an image. In the projection type display apparatus 110, the wire grid polarization element 1 in which the invention is applied to any one or both of first polarization plates 115b, 116b, and 117b, and second polarization plates 115d, 116d, and 117d which will be described below is used.

The projection type display apparatus 110 includes, along a device optical axis L0, a lighting device 160, a plurality of light valves (liquid crystal light valves 115 to 117) to which the light emitted from the lighting device 160 is supplied, a cross dichroic prism 119 (photosynthetic optical system) that synthesizes and emits the light emitted from the liquid crystal light valves 115 to 117, and a projection optical system 118 that projects the light synthesized by the cross dichroic prism 119. In addition, the projection type display apparatus 110 is provided with dichroic mirrors 113 and 114, and a relay system 120. In the projection type display apparatus 110, the liquid crystal light valves 115 to 117, and the cross dichroic prism 119 constitute an optical unit 150.

In the lighting device 160, a light source unit 161, a first integrator lens 162 formed of a lens array such as a fly's eye lens, a second integrator lens 163 formed of a lens array such as a fly's eye lens, a polarization conversion element 164, and a condenser lens 165 are arranged in this order along the device optical axis L0. The light source unit 161 is provided with a light source 168 that emits white light including red light R, green light G, and blue light B, and a reflector 169. The light source 168 is formed of an extra-high pressure mercury lamp or the like, and the reflector 169 has a parabolic cross section. The first integrator lens 162 and the second integrator lens 163 equalize illuminance distribution of the light emitted from the light source unit 161. The polarization conversion element 164 turns the light emitted from the light source unit 161 into polarized light having a specific vibration direction such as, for example, s-polarized light.

The dichroic mirror 113 allows red light R included in the light emitted from the lighting device 160 to be transmitted and green light G and blue light B are reflected thereon. Among the green light G and the blue light B reflected on the dichroic mirror 113, the dichroic mirror 114 allows the blue light B to be transmitted and the green light G is reflected thereon. As described above, the dichroic mirrors 113 and 114 constitute a color separation optical system that separates the light emitted from the lighting device 160 into the red light R, the green light G, and the blue light B.

The liquid crystal light valve 115 is a transmissive liquid crystal device that modulates the red light R transmitted through the dichroic mirror 113 and reflected on the reflection mirror 123 in response to an image signal. The liquid crystal light valve 115 is provided with a λ/2 retardation plate 115a, a first polarization plate 115b, a liquid crystal panel 100R, and a second polarization plate 115d. Here, the red light R incident on the liquid crystal light valve 115 remains the s-polarized light from the aspect that the polarization of the light does not change even if the red light R passes through the dichroic mirror 113.

The λ/2 retardation plate 115a is an optical element that converts the s-polarized light incident on the liquid crystal light valve 115 into the p-polarized light. The first polarization plate 115b is a polarizing that blocks the s-polarized light and allows the p-polarized light to be transmitted. The liquid crystal panel 100R is configured to convert the p-polarized light into the s-polarized light (circularly polarized light or elliptically polarized light in a case of halftone) by modulation in response to an image signal. The second polarization plate 115d is a polarizing that blocks the p-polarized light and allows the s-polarized light to be transmitted. Accordingly, the liquid crystal light valve 115 modulates the red light R in response the image signal, and emits the modulated red light R toward the cross dichroic prism 119.

The liquid crystal light valve 116 is a transmissive liquid crystal device that modulates the green light G reflected on the dichroic mirror 113 and reflected on the dichroic mirror 114 in response to an image signal. Similar to the liquid crystal light valve 115, the liquid crystal light valve 116 is provided with a first polarization plate 116b, a liquid crystal panel 100G, and a second polarization plate 116d. The green light G incident on the liquid crystal light valve 116 is the s-polarized light reflected and incident on the dichroic mirror 113 and 114. The first polarization plate 116b is a polarizing that blocks the p-polarized light and allows the s-polarized light to be transmitted. The liquid crystal panel 100G is configured to convert the s-polarized light into the p-polarized light (circularly polarized light or elliptically polarized light in a case of halftone) by modulation in response to an image signal. The second polarization plate 116d is a polarizing that blocks the s-polarized light and allows the p-polarized light to be transmitted. Accordingly, the liquid crystal light valve 116 modulates the green light G in response the image signal, and emits the modulated green light G toward the cross dichroic prism 119.

The liquid crystal light valve 117 is a transmissive liquid crystal device that modulates the blue light B passing through the relay system 120 after being reflected on the dichroic mirror 113 and transmitted through the dichroic mirror 114 in response to an image signal. Similar to the liquid crystal light valves 115 and 116, the liquid crystal light valve 117 is provided with a λ/2 retardation plate 117a, a first polarization plate 117b, a liquid crystal panel 100B, and a second polarization plate 117d. The blue light B incident on the liquid crystal light valve 117 is reflected on two reflection mirrors 125a and 125b of the relay system 120 after being reflected on the dichroic mirror 113 and transmitted through the dichroic mirror 114 so as to become s-polarized light.

The λ/2 retardation plate 117a is an optical element that converts the s-polarized light incident on the liquid crystal light valve 117 into the p-polarized light. The first polarization plate 117b is a polarizing that blocks the s-polarized light and allows the p-polarized light to be transmitted. The liquid crystal panel 100B is configured to convert the p-polarized light into the s-polarized light (circularly polarized light or elliptically polarized light in a case of halftone) by modulation in response to an image signal. The second polarization plate 117d is a polarizing that blocks the p-polarized light and allows the s-polarized light to be transmitted. Accordingly, the liquid crystal light valve 117 modulates the blue light B in response the image signal, and emits the modulated blue light B toward the cross dichroic prism 119.

The relay system 120 is provided with a relay lenses 124a and 124b, and reflection mirrors 125a and 125b. The relay lenses 124a and 124b are provided to prevent light loss due to the long optical path of the blue light B. The relay lens 124a is disposed between the dichroic mirror 114 and the reflection mirror 125a. The relay lens 124b is disposed between the reflection mirrors 125a and 125b. The reflection mirror 125a reflects the blue light B which is transmitted through the dichroic mirror 114 and emitted from the relay lens 124a toward the relay lens 124b. The reflection mirror 125b reflects the blue light B emitted from the relay lens 124b toward the liquid crystal light valve 117.

The cross dichroic prism 119 is a color synthesizing optical system in which two dichroic films 119a and 119b are orthogonally arranged in an X shape. The dichroic film 119a is a film on which the blue light B is reflected and through which the green light G is transmitted and the dichroic film 119b is a film on which the red light R is reflected and through which the green light G is transmitted. Accordingly, the cross dichroic prism 119 synthesizes the red light R, the green light G, and the blue light B which are modulated by each of the liquid crystal light valves 115 to 117, and emitted toward the projection optical system 118.

Note that, the light incident on the cross dichroic prism 119 from the liquid crystal light valves 115 and 117 is the s-polarized light, and the light incident on the cross dichroic prism 119 from the liquid crystal light valve 116 is the p-polarized light. As described above, when the light incident on the cross dichroic prism 119 is set to be different kinds of polarized light, it is possible to synthesize the light incident on the cross dichroic prism 119 from each of the liquid crystal light valves 115 to 117. Here, generally, the dichroic films 119a and 119b are excellent in the reflection properties of the s-polarized light. For this reason, the red light R and the blue light B which are reflected on the dichroic films 119a and 119b are set as the s-polarized light, and the green light G transmitted through the dichroic films 119a and 119b is set as the p-polarized light. The projection optical system 118 includes a projection lens (not shown), and projects the light synthesized by the cross dichroic prism 119 to the member to be projected 111 such as a screen.

Configuration Example 2 Projection Type Display Apparatus

FIG. 7 is a diagram of a projection type display apparatus using a reflection type liquid crystal panel, and the wire grid polarization element 1 in which the invention is applied to wire grid polarization plates 1032r, 1032g, and 1032b which are will be described below. In addition, the wire grid polarization element 1 in which the invention is applied to any one or both of the incident side polarization plates 1037b, 1037g, and 1037r, and the emission side polarization plates 1038b, 1038g, and 1038r may be used.

The projection type display apparatus 1000 as illustrated in FIG. 7 includes a light source unit 1021 that generates light source light, a color separation light guide optical system 1023 that separates the light source light emitted from the light source unit 1021 into three colors of red, green, and blue, and a light modulating unit 1025 illuminated by the light source light of each color emitted from the color separation light guide optical system 1023. In addition, the projection type display apparatus 1000 is provided with a cross dichroic prism 1027 (synthetic optical system) for synthesizing the image light of each color emitted from the light modulating unit 1025, and a projection optical system 1029 which is a projection optical system for projecting the image light passing through the cross dichroic prism 1027 to the screen (not shown).

In the projection type display apparatus 1000, the light source unit 1021 is provided with a light source 1021a, a pair of fly eye optical systems 1021d and 1021e, a polarization conversion member 1021g, and a superposing lens 1021i. In the embodiment, the light source unit 1021 is provided with a reflector 1021f formed of a parabolic surface, and emits parallel light. The fly eye optical systems 1021d and 1021e are formed a plurality of element lenses arranged in a matrix in a plane orthogonal to the system optical axis, and the light source light is split by these element lenses so as to individually condense and diverge. The polarization conversion member 1021g converts the light source light emitted from the fly eye optical system 1021e into only a p-polarized light component in parallel to the drawings for example so as to be supplied to the optical system on the downstream side of the optical path. The superposing lens 1021i appropriately converges the light source light passing through the polarization conversion member 1021g as a whole so as to perform uniformly superimposed illumination on each of the plurality of liquid crystal panels 100 (R), (G), and (B) provided in the light modulating unit 1025.

The color separation light guide optical system 1023 is provided with a cross dichroic mirror 1023a, a dichroic mirror 1023b, and reflection mirrors 1023j and 1023k. In the color separation light guide optical system 1023, approximately white light source light from the light source unit 1021 is incident on the cross dichroic mirror 1023a. The red (R) light reflected on the first dichroic mirror 1031a constituting the cross dichroic mirror 1023a is transmitted through the dichroic mirror 1023b after being reflected on the reflection mirror 1023j, and is incident on the liquid crystal panel 100 (R) for red (R) as being the p-polarized light via the incident side polarization plate 1037r, the wire grid polarization plate 1032r, and the optical compensation plate 1039r.

The green (G) light reflected on the first dichroic mirror 1031a is also transmitted through the dichroic mirror 1023b after being reflected on the reflection mirror 1023j, and is incident on the liquid crystal panel 100 (G) for green (G) as being the p-polarized light via the incident side polarization plate 1037g, the wire grid polarization plate 1032g, and the optical compensation plate 1039g.

In contrast, the blue (B) light reflected on the second dichroic mirror 1031b constituting the cross dichroic mirror 1023a is reflected on the reflection mirror 1023k, and is incident on the liquid crystal panel 100 (B) for blue (B) as being the p-polarized light via the incident side polarization plate 1037b, the wire grid polarization plate 1032b, and the optical compensation plate 1039b. Note that, the optical compensation plates 1039r, 1039g, and 1039b optically compensate the properties of the liquid crystal layer by adjusting the polarization state of the incident light and the emitted light to the liquid crystal panel 100 (B).

In the projection type display apparatus 1000 configured as described, each of three colors of lights incident by passing through the optical compensation plates 1039r, 1039g, and 1039b is modulated in each of the liquid crystal panels 100 (R), (G), and (B). At that time, among the modulated lights emitted from the liquid crystal panels 100 (R), (G) and (B), component light of the s-polarized light is reflected on the wire grid polarization plates 1032r, 1032g, 1032b, and is incident on the cross dichroic prism 1027 via the emission side polarization plates 1038r, 1038g, and 1038b. The first dielectric multilayer film 1027a and the second dielectric multilayer film 1027b which cross in a X shape in the cross dichroic prism 1027, and the R light is reflected on one first dielectric multilayer film 1027a, and the B light is reflected on the other second dielectric multilayer film 1027b. Accordingly, the three colors of lights are synthesized in the cross dichroic prism 1027, and then emitted to the projection optical system 1029. In addition, the projection optical system 1029 projects the image light of the color synthesized in the cross dichroic prism 1027 to the screen (not shown) at a desired magnification.

Other Projection Type Display Apparatus

Note that, for the projection type display apparatus, a configuration in which an LED light source or the like for emitting light of each color is used as a light source unit, and color light emitted from the LED light source is supplied to another liquid crystal device may be used.

This application claims priority to Japan Patent Application No. 2017-048368 filed Mar. 14, 2017, the entire disclosures of which are hereby incorporated by reference in their entireties.

What is claimed is:

1. A wire grid polarization element comprising:
   a first light transmitting substrate which is a single element made of a uniform and continuous material;
   a metallic wire grid formed on a first surface of the first light transmitting substrate, the metallic wire grid including a plurality of metal wires arranged in parallel with a space in-between along a first direction; and
   a second light transmitting substrate facing the first surface of the first light transmitting substrate,
   wherein at least one of the first surface of the first light transmitting substrate and a surface of the second light transmitting substrate facing the first light transmitting substrate includes an inclined surface at both ends in the first direction to define a recessed portion in a middle region, the metallic wire grid being formed on the recessed portion in the middle region without being formed on the inclined surface at both ends in the first direction, and
   wherein the first light transmitting substrate and the second light transmitting substrate are bonded to each other on an outer side of the recessed portion so as to seal the recessed portion without a spacer, such that a hollow space is formed between the metallic wire grid and the second light transmitting substrate.

2. The wire grid polarization element according to claim 1, wherein an inner wall of the recessed portion is a tapered surface.

3. The wire grid polarization element according to claim 1, wherein the hollow space in which the wire grid is disposed is filled with an inert gas.

4. The wire grid polarization element according to claim 1, wherein the metallic wire grid is formed of aluminum, an alloy containing aluminum as a main component, silver, or an alloy containing silver as a main component.

5. The wire grid polarization element according to claim 1, wherein a light absorbing layer is formed at an end portion of the metallic wire grid on a side opposite to the first light transmitting substrate.

6. The wire grid polarization element according to claim 1, wherein an antireflection layer is formed on at least one of:
   the first surface of the first light transmitting substrate,
   a surface on a side opposite to the first surface of the first substrate,
   the surface of the second light transmitting substrate facing the first light transmitting substrate, and
   a surface of the second substrate on a side opposite to the first light transmitting substrate.

7. The wire grid polarization element according to claim 1, wherein the first light transmitting substrate and the second light transmitting substrate are formed of a same material.

8. The wire grid polarization element according to claim 1, wherein the recessed portion is formed on the first light transmitting substrate.

9. The wire grid polarization element according to claim 1, wherein the recessed portion is formed on the second light transmitting substrate.

10. A projection type display apparatus which is provided with a wire grid polarization element, the apparatus comprising:
    a liquid crystal panel;
    a light source unit that emits light to be supplied to the liquid crystal panel; and
    a projection optical system that projects light modulated by the liquid crystal panel,
    wherein the wire grid polarization element is disposed on an optical path from the light source unit to the projection optical system via the liquid crystal panel, and
    wherein the wire grid polarization element comprises:
       a first light transmitting substrate which is a single element made of a uniform and continuous material;
       a metallic wire grid formed on a first surface of the first light transmitting substrate, the metallic wire grid including a plurality of metal wires arranged in parallel with a space in-between along a first direction; and
       a second light transmitting substrate facing the first surface of the first light transmitting substrate,
       wherein at least one of the first surface of the first light transmitting substrate and a surface of the second light transmitting substrate facing the first light transmitting substrate includes an inclined surface at both ends in the first direction to define a recessed portion in a middle region, the metallic wire grid being formed on the recessed portion in the middle region without being formed on the inclined surface at both ends in the first direction, and wherein the first light transmitting substrate and the second light transmitting substrate are bonded to each other on an outer side of the recessed portion so as to seal the recessed portion such that a hollow space is formed between the metallic wire grid and the second light transmitting substrate.

11. The projection type display apparatus according to claim 10, wherein an inner wall of the recessed portion is a tapered surface.

12. The projection type display apparatus claim 10, wherein the hollow space in which the wire grid is disposed is filled with an inert gas.

13. The projection type display apparatus according to claim 10, wherein the metallic wire grid is formed of aluminum, an alloy containing aluminum as a main component, silver, or an alloy containing silver as a main component.

14. The projection type display apparatus according to claim 10, wherein a light absorbing layer is formed at an end portion of the metallic wire grid on a side opposite to the first light transmitting substrate.

15. The projection type display apparatus according to claim 10, wherein an antireflection layer is formed on at least one of:

the first surface of the first light transmitting substrate, a surface on a side opposite to the first surface of the first substrate, the surface of the second light transmitting substrate facing the first light transmitting substrate, and a surface of the second substrate on a side opposite to the first light transmitting substrate.

16. The projection type display apparatus according to claim 10, wherein the first light transmitting substrate and the second light transmitting substrate are formed of a same material.

17. The projection type display apparatus according to claim 10, wherein the recessed portion is formed on the first light transmitting substrate.

18. The projection type display apparatus according to claim 10, wherein the recessed portion is formed on the second light transmitting substrate.

19. A wire grid polarization element comprising:

a first light transmitting substrate that includes an upper surface, a bottom surface, and an inclined surface that is positioned between the upper surface and the bottom surface;

a metallic wire grid that is formed on the bottom surface of the first light transmitting substrate, the metallic wire grid including a plurality of metal wires arranged in parallel with a space in-between along a first direction, the metallic wire grid being formed on the bottom surface without being formed on the inclined surface that is disposed at both ends of the bottom surface along the first direction; and a second light transmitting substrate that is bonded to the upper surface of the first light transmitting substrate without a spacer, such that a hollow space is formed between the metallic wire grid and at least one of the first light transmitting substrate and the second light transmitting substrate.

20. The wire grid polarization element according to claim 19, wherein the first light transmitting substrate and the second light transmitting substrate are made of a same material.

* * * * *